United States Patent [19]

Pröll et al.

[11] 4,318,776
[45] Mar. 9, 1982

[54] MEASURING LANCE FOR BOILING-WATER NUCLEAR REACTORS

[75] Inventors: Norbert Pröll, Dreieich; Siegfried Bertz, Karlstein; Karl-Heinz Gräbener, Alzenau, all of Fed. Rep. of Germany

[73] Assignee: Kraftwerk Union Aktiengesellschaft, Mülheim, Fed. Rep. of Germany

[21] Appl. No.: 58,474

[22] Filed: Jul. 18, 1979

[30] Foreign Application Priority Data

Jul. 21, 1978 [DE] Fed. Rep. of Germany ....... 2832122

[51] Int. Cl.³ ............................................... G21C 17/00
[52] U.S. Cl. ................................................... 376/254
[58] Field of Search ................ 176/19 R, 19 J, 19 EC

[56] References Cited

U.S. PATENT DOCUMENTS

| | | | |
|---|---|---|---|
| 3,751,333 | 8/1973 | Drummond et al. | 176/19 J |
| 3,769,156 | 10/1973 | Brecy | 176/19 R |
| 3,827,935 | 8/1974 | Gruner et al. | 176/19 R |
| 3,860,824 | 1/1975 | Stone | 176/19 R |
| 3,893,651 | 7/1975 | Vecker | 176/19 R |
| 3,932,211 | 1/1976 | Loving | 176/19 R |
| 4,046,632 | 9/1977 | Puchelt et al. | 176/19 J |
| 4,064,000 | 10/1977 | Addrea | 176/19 R |
| 4,097,330 | 6/1978 | Neissel et al. | 176/19 R |

FOREIGN PATENT DOCUMENTS

| | | | |
|---|---|---|---|
| 51-13095 | 2/1976 | Japan | 176/19 R |
| 53-9679 | 7/1978 | Japan | 176/19 J |

*Primary Examiner*—Sal Cangialosi
*Attorney, Agent, or Firm*—Herbert L. Lerner

[57] ABSTRACT

A measuring lance forming part of the core instrumentation of a boiling-water nuclear reactor and extending from the bottom of a reactor pressure vessel through the core in a water gap between the fuel assemblies of the core, the lance having radiation detectors respectively located at different height levels thereof, and further containing a travelling chamber system for calibrating the detectors and continuously determining neutron flux distribution, the improvement therein including thimble tubes wherein the detectors are received, the thimble tubes extending through the wall of the pressure vessel and being sealed from the interior of the pressure vessel, and means for individually displacing and exchanging the detectors during reactor operation.

7 Claims, 9 Drawing Figures

MEASURING LANCE FOR BOILING-WATER NUCLEAR REACTORS

The invention of the instant application relates to a measuring lance as part of the core instrumentation of boiling-water nuclear reactors and, more particularly to such a lance which extends from the bottom of the reactor pressure vessel preferably through the entire height of the reactor core in the water gap between the fuel assemblies and is provided at different height levels with a respective radiation measuring device, hereinafter referred to as detector for short, and contains a so-called travelling chamber system for calibrating the detectors and continuously determining the neutron flux distribution. The use of such measuring lances for boiling-water nuclear reactors is generally known and conventional, a detailed description thereof being found, for example, in the journal VGB Kraftwerkstechnik 53, No. 3, March 1973, pages 165 to 168. In installed condition, these measuring lances extend practically over the entire height of the reactor core and are equipped with neutron flux detectors at different elevations thereof. These detectors are rigidly connected to a so-called travelling-chamber guide tube, in the interior of which a neutron detector, the so-called travelling chamber, can be moved over the entire height of the reactor core during operation of the reactor, so that thereby a calibration as well as a check of monitoring of the operability of the stationary detectors is possible.

This measuring system has been proven highly satisfactory to date, but it has the disadvantage that the reactor pressure vessel must be opened if a detector should fail, since the measuring lance can be removed only upwardly. To this end, a number of fuel assemblies must further be discharged first, which requires considerable additional time.

Since it is well known that any interruption in the operation of a nuclear power plant, especially due to failure of current or power delivery, is accompanied by great financial losses, it is an object of the invention to provide a measuring lance for boiling water nuclear reactors which avoids or greatly reduces interruptions in the operation of a nuclear power plant which have heretofore been necessary due to the replacement of the measuring lances.

With the foregoing and other objects in view, there is provided, in accordance with the invention, a measuring lance forming part of the core instrumentation of a boiling-water nuclear reactor and extending from the bottom of a reactor pressure vessel through the core in a water gap between the fuel assemblies of the core, the lance having radiation measuring devices or detectors respectively located at different height levels thereof, and further containing a travelling chamber system for calibrating the detectors and continuously determining neutron flux distribution, the improvement therein comprising thimble tubes wherein the detectors are received, said thimble tubes extending through the wall of the pressure vessel and being sealed from the interior of the pressure vessel, and means for individually displacing and exchanging the detectors during reactor operation.

In accordance with another feature of the invention, the measuring lance includes a lance enclosure tube formed with lateral bores, the lance enclosure tube receiving the thimble tubes therewithin, means for supplying a flow of reactor coolant to the interior of the lance enclosure tube for contacting the thimble tubes, and means for cooling the detectors.

In accordance with a further feature of the invention, the detector cooling means are formed of meterial facilitating heat removal from the thimble tube.

In accordance with a further feature of the invention, the material is a fluid selected from the group of fluids consisting of gases and liquids.

In accordance with an alternate feature of the invention, the detector cooling means comprise heat-conductive contact elements disposed between the detectors and the thimble tubes.

In accordance with an added feature of the invention, the contact elements are metallic.

Thus, the service life of the detectors is not reduced by heating that is induced by the gamma radiation of the reactor.

In accordance with an additional feature of the invention, the travelling chamber system comprises a travelling chamber tube, the lance enclosure tube has a cross section matching the shape of the water gap between four of the fuel assemblies of the core disposed symmetrically to one another, four of the thimble tubes and the travelling chamber tube disposed centrally thereof being received in the lance enclosure tube and forming a structural unit therewith, the structural unit being releasably connected pressure-tightly to the base of the pressure vessel, the structural unit being withdrawable upwardly for replacement during reactor shutdown and when the pressure-vessel cover is opened.

This invention is therefore based on the idea that the measuring lance and the detectors are not to be connected unreleasably to one another as heretofore, but rather are to be separated from one another. In addition to the thimble tube for the travelling chamber (the so-called travelling chamber guide tube), a separate thimble tube is provided for each individual detector. These thimble tubes extend pressure-tightly out through the base or bottom of the reactor pressure vessel, so that reactor coolant flows around the outside thereof within the reactor pressure vessel, while the detectors disposed in the interior, however, remain absolutely dry and the position thereof is accurately adjustable.

In accordance with yet another feature of the invention, the measuring lance includes a lance guide tube, the lance enclosure tube having a collar thereon at a location thereof above a lower core grid support of the reactor, the collar forming a downwardly directed annular gap and engaging over an end of the lance guide tube, the lance guide tube extending through the base of the pressure vessel and being welded thereto, the lance guide tube having a lower end projecting beyond the pressure-vessel base and releasably connected pressure-tightly to the lance enclosure tube.

In accordance with a concomitant feature of the invention, there are provided means comprising a unilaterally closed sealing sleeve for water-tightly closing the lower end of the lance guide tube after the pressure-tight connection thereof to the lance enclosure tube is released and before the structural unit is withdrawn upwardly.

The disposition of the measuring lances according to the invention corresponds to that which has been conventional heretofore i.e. the measuring lances according to the invention are always located, respectively, at intersections of the water gaps between four adjacent fuel assemblies, respectively.

The most important advantages obtainable with the new measuring lance principle according to the invention are the following:

(a) Detector replacement can be effected without opening the reactor pressure vessel, that is, from outside the pressure vessel i.e. from the control rod drive chamber which is located underneath the pressure vessel in the case of a boiling-water reactor.

(b) When replacing the detectors, it is unnecessary to remove any fuel assemblies; in constrast thereto, at least 10 adjacent fuel assemblies had to be removed heretofore to replace the lance including the detectors. By avoiding the shutdown times caused thereby, savings of many thousands of dollars are obtained.

(c) Detector replacement is independent of the fuel rod cycle; heretofore, detector replacement had to be matched as far as possible to the fuel cycles, during which the reactor had to be shut down for a fuel change anyway.

(d) The life of the detector can be utilized optimally. Since the detectors are deployed at locations with a neutron flux of varying magnitudes, they reach the end of the service life thereof following periods of varying length. Heretofore, a whole lance had to be replaced when only one of the detectors thereof had reached the end of the service life thereof. With the invention of the instant application, individual detectors can be replaced without affecting the other detectors of a measuring lance.

(e) The detectors can be replaced quickly and simply. In nuclear power plants wherein access by personnel to the control rod drive chamber during operation is possible and permissible, these detectors can also be replaced during operation.

(f) Since the detectors and the coaxial cables associated therewith no longer come into contact with the reactor water, danger of corrosion is reduced to a minimum. This can be reduced further yet by providing a protective-gas atmosphere within the thimble tubes.

(g) By guiding the detectors within the thimble tubes which are held exactly at a mutually constant distance or spacing, a definite fixing of the detectors within the reactor core and also with respect to the detector insertable into the travelling-chamber guide tube is afforded, so that the accuracy of the detector calibration is thereby increased.

(h) Less accumulation of radioactive wastes occurs. Heretofore, a lance had to be disassembled about every three years and broken or cut up under water because of the induced radioactivity therein, and removed at correspondingly high cost. With the new measuring lance according to the invention, this measure is necessary only about every 10 years, so that the radioactive waste to be removed is only ⅓ of the waste presently produced.

To illustrate and explain this invention in further detail, reference is made to the embodiment shown in FIGS. 1 to 7. The construction and geometrical shape of this measureing lance were selected so that the lance according to the invention is interchangeable with a lance designed in accordance with the present state of the art. Other constructions are consequently possible for the lance according to the invention, especially if interchangeability with presently used conventional measuring lances is not a requirement.

Other features which are considered as characteristic for the invention are set forth in the appended claims.

Although the invention is illustrated and described herein as embodied in a measuring lance for boiling-water nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
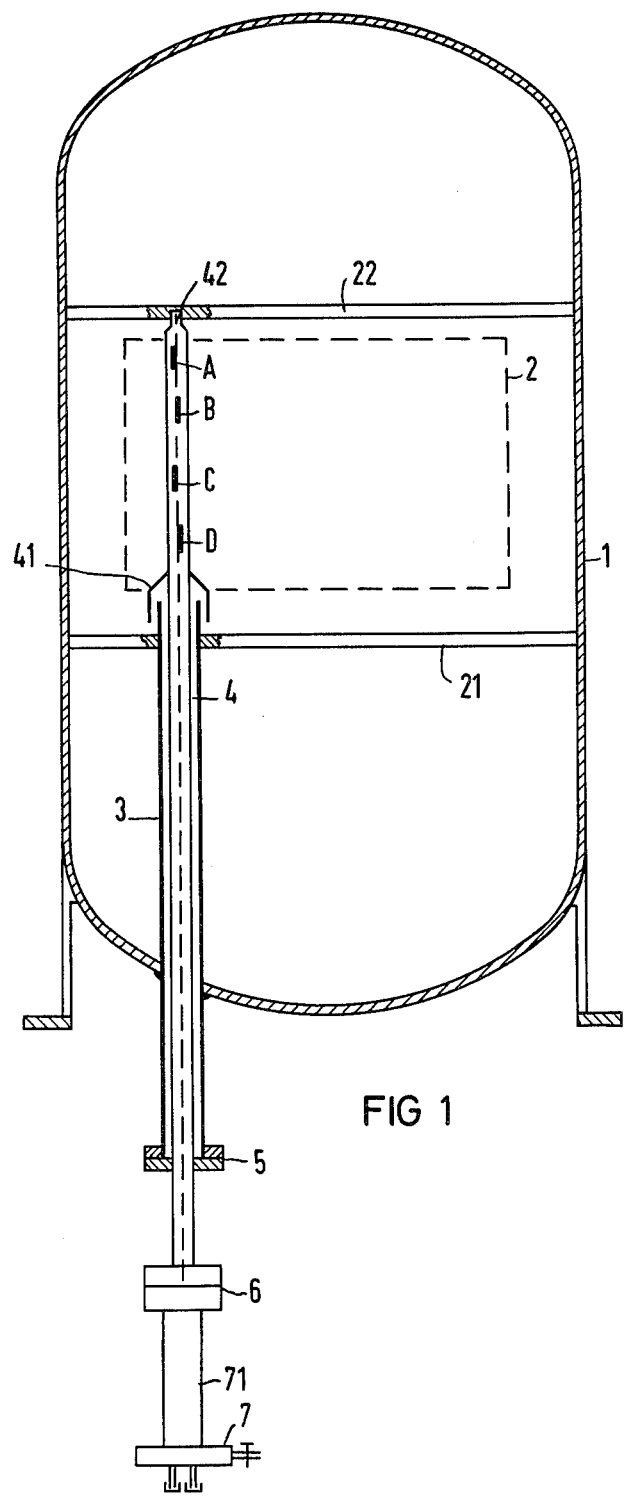
FIG. 1 is a diagrammatic vertical sectional view of a nuclear reactor with a measuring lance according to the invention.

Referring now to the drawing and first, particularly, to FIG. 1 thereof, there is shown a reactor pressure vessel 1 containing a reactor core 2 represented diagrammatically by broken lines.

The reactor core 2 is defined at the bottom thereof by the lower core support or grid plate 21 and at the top thereof by the upper core support or grid plate 22. In the interest of clarity, fuel assemblies and control rods with their drives are not shown in the drawing. Of a multiplicity of measuring lances that are normally inserted into the nuclear reactor, only one is shown diagrammatically in the relationship thereof to the aforementioned reactor components. On the outside, the measuring lance has a cladding tube 4, in the interior of which is a thimble tube 9 (FIG. 4A) for a travelling chamber as well as thimble tubes 8 (FIG. 4B) for detectors A to D. The location of these detectors A to D relative to the reactor core 2 can be seen, for example, in FIG. 1. This lance cladding or enclosure tube 4 is braced with the upper end 42 thereof against the upper core grid plate 22 and is seated with a collar 41 on a lance guide tube 3 which is welded pressure and watertightly into the bottom of the pressure vessel 1. This collar 41 has, as its purpose, largely to prevent any accumulation of dirt between the lance tube 3 and the lance enclosure or cladding tube 4. This is to prevent corrosion as much as possible, as well as increased contamination, which must be removed when lances are replaced. The lance guide tube 3 is provided at the lower end thereof with a flange 5 which ensures pressure-tight closure with respect to the lance cladding or enclosure tube 4 and the thimble tubes pressure-tightly enclosed thereby. The lance cladding or enclosure tube 4, which extends downwardly from the flange closure 5, is provided, through a coupling 6, with an elongation section or member 71, formed with bores 83 (FIG. 4A) which elongate the thimble tubes, the bores 83 having outlet openings which, at an end member 7, have a greater mutual spacing, so that it is more readily possible to effect closures thereof, for example, with sealing end caps. It should be noted in advance that this extension member or section 71 is required only for such lances which are to be inserted as replacements for the conventional lances used heretofore, without having to modify the reactor pressure vessel per se. Since the space under the reactor pressure vessel 1, furthermore, contains a multiplicity of non-illustrated control rod drive devices, this extension device 71 must be constructed so that the connection to the lance cladding or enclosure tube 4 at the coupling location 6 can be effected, as it were, remotely-controlled from below.

Figure 2:
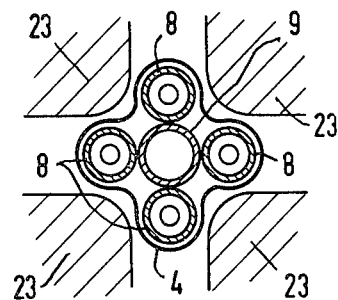
FIG. 2 is an enlarged fragmentary sectional view of FIG. 1 showing the measuring lance in relation to the fuel assemblies of the reactor core.
Figure 3:
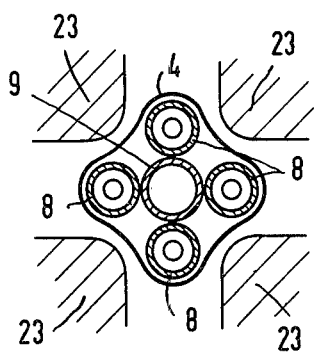
FIG. 3 is a view similar to that of FIG. 2 of another embodiment of the lance having a lance enclosure tube with a modified cross section.

The disposition of such a measuring lance between the individual fuel assemblies 23 of the reactor core 2 is shown in cross-sectional views of different embodiments thereof in FIGS. 2 and 3. Clearly shown in FIGS. 2 and 3 are the fuel assemblies 23, the thimble tubes 8 for the neutron detectors, and the travelling-chamber tube 9. In the case wherein the nuclear core 2 has a closer mutual spacing of the fuel assemblies 23 as shown in FIG. 2, the lance cladding or enclosure tube 4 that is employed has somewhat cross-shaped or cruciform cross section; when the water gaps between the fuel assemblies 23 are larger, however, as shown, for example, in FIG. 3, the lance cladding or enclosure tube 4 has a cross section more closely resembling a square. It should be noted at this point that other non-illustrated spacer members are provided within this lance guide tube 4 to ensure the nominal geometrical spacings between the thimble tubes 8 and 9 surrounded thereby.

Figure 4A:
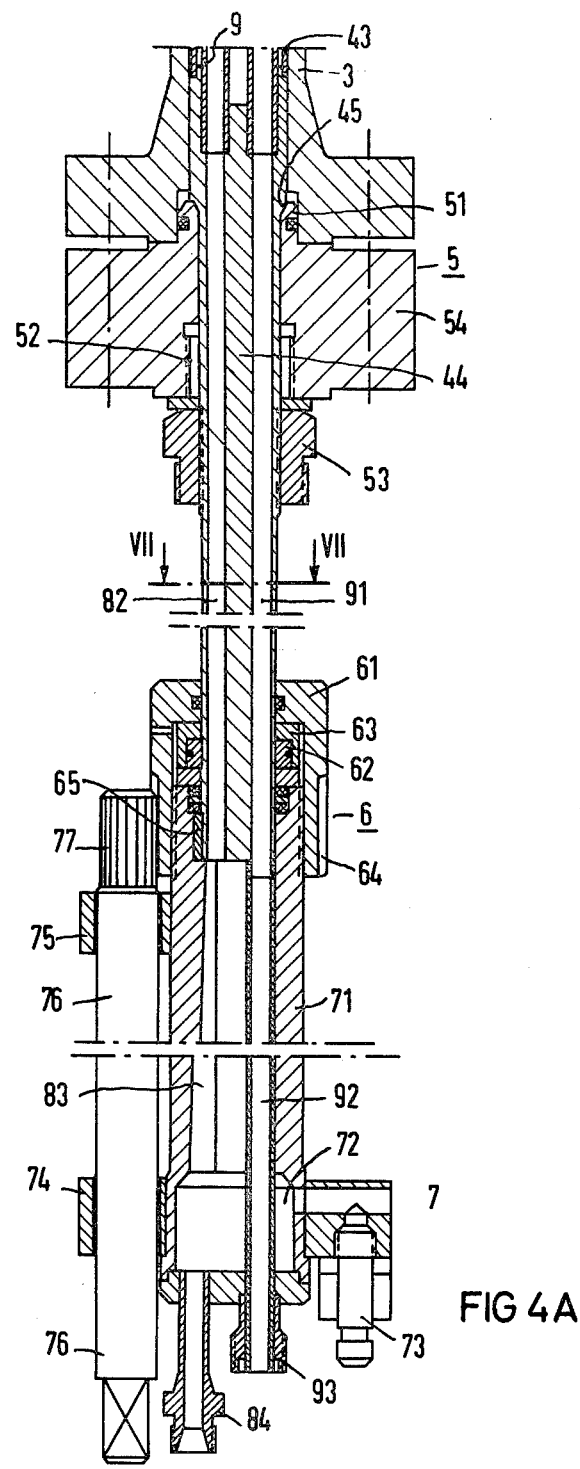
FIGS. 4A, 4B and 4C are enlarged lower, middle and upper sections, respectively, of the lance as viewed in FIG. 1.
Figures 4B, 4C:
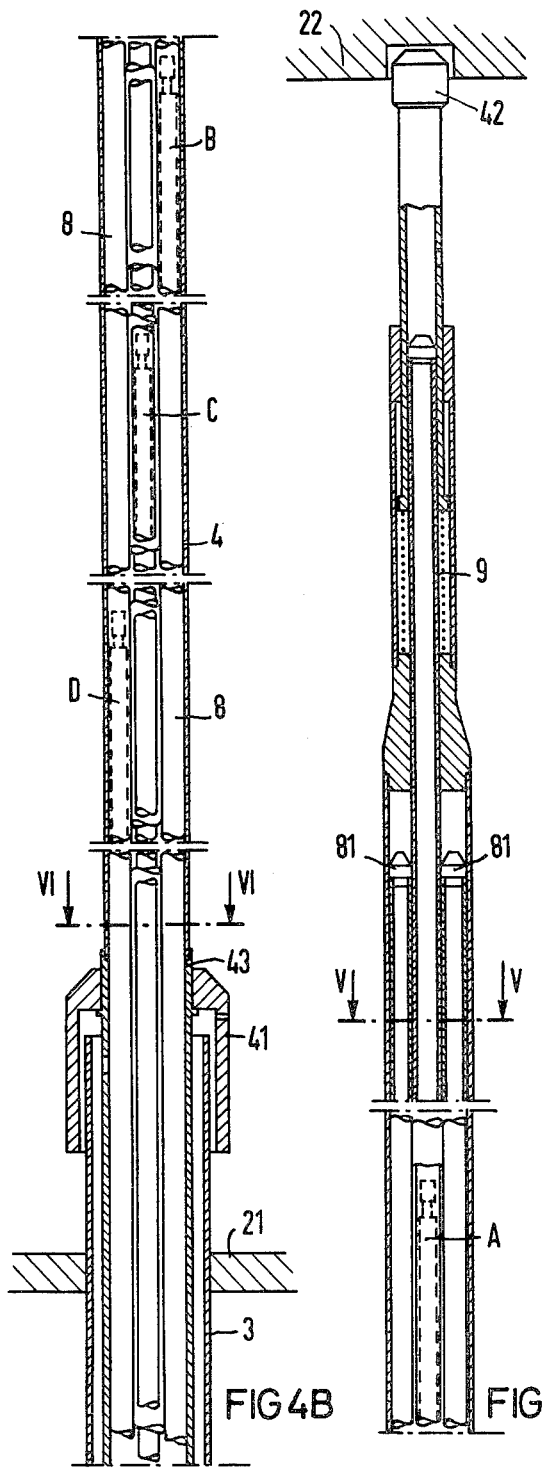
Figure 5:
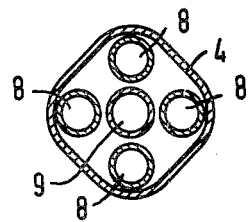
FIGS. 5, 6 and 7 are cross-sectional views, respectively, of FIG. 4C taken along the line V—V, FIG. 4B taken along the line VI—VI and FIG. 4A taken along the line VII—VII.

FIGS. 4A, 4B and 4C, taken together, offer a diagrammatic longitudinal sectional view of the measuring lance constructed in accordance with the invention. The lance cladding or enclosure tube 4 is provided at the upper end thereof with a telescope-like extension 42, which is braced resiliently against the upper-core support grid plate 22. As is apparent from FIGS. 2 and 3, the travelling-chamber guide tube 9 extends centrally through the lance guide tube and serves, in the uppermost part thereof, for guiding the telescope part 42 and the diagrammatically illustrated spring associated therewith. At the end face thereof, the part 42 is welded pressure-tightly shut by means of an end plug. The thimble tubes 8, which are again pressure-tightly shut by end plugs 81, are symmetrically disposed around the travelling-chamber guide tube 9. The detectors A, B, C and D, which are indicated by broken lines in FIGS. 4B and 4C, are received in the thimble tubes 8 and the lance enclosure tube 4 can also be seen from FIG. 5, which is a cross-sectional view taken along the line V—V in FIG. 4C.

Below the last detector D, as viewed in FIG. 4B, but yet above the lower core support grid 21, there is a transition of the more square-like lance enclosure tube 4 to that of a circular cross section which is welded to the extension tube 42.

At this circular cross-sectional location, a collar 41 is also welded on, surrounding the lance guide tube 3 in the manner shown. The latter is shown only diagrammatically with the upper end thereof at a feedthrough or passageway through the lower core support grid 21.

Figure 6:
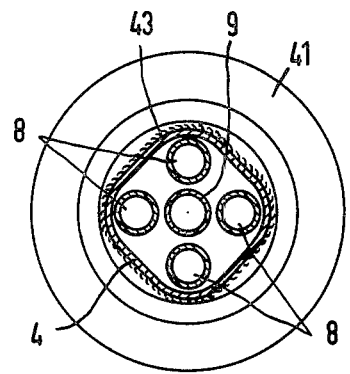

FIG. 6 is a cross-sectional view of the measuring lance taken along the line VI—VI in FIG. 4B. The transition to the circular cross section as well as a top plan view of the collar 41 can be seen in FIG. 4B.

An extension 43 of the lance enclosure tube 4 is then continued downwardly to the flanged joint 5 with the lance guide tube 3 (note FIG. 1).

Since a pressure-tight seal between the lance guide tube 4/43 and the enclosed thimble tubes 8 and 9 is necessary, as mentioned hereinbefore, the extension section 43 is welded shortly forward of the joint 5 to another, though now solid or massive, extension 44. This Extension 44 is provided with bores 91 and 82, into which the thimble tubes 8 and 9 are soldered.

Figure 7:
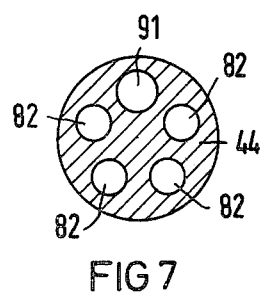

As is evident from FIG. 7, which is a cross-sectional view taken along the line VII—VII through the solid extension 44 in FIG. 4A, the travelling-chamber guide tube 91 is now no longer in a central position, but rather, together with the other thimble tubes or the extensions 82 thereof, on a common center circle. The arrangement of the thimble tubes into this changed geometrical relationship is provided in the extension tube 43. The very slight deviations of the thimble tubes from an exact straight line, considering the great length of this tube section, permits the detectors to move through this transition section without difficulty.

At the height of the joint 5, it is, therefore, only necessary to establish a seal against the lance guide tube 3. This is accomplished through the conical surfaces 45 on the part 44 as well as the conical surfaces 51 on the pressure flange 54. The conical joint 45/51 is pressed absolutely tightly together by means of a nut 53 which travels on an outer thread formed on the part 44.

Normally, the closures for the thimble tubes or the insertion mechanism for the travelling-chamber system could then be located at the end of the drilled-through solid part 44. This is only possible, however, if the reactor construction has been previously prepared to accommodate this new measuring lance, i.e. the lance guide tube 3 must be of such diameter that a lance enclosure tube 4 will fit therethrough, the clearance or spacing between the thimble tubes presenting no problem for the provision or application of corresponding closures, connecting parts, and the like.

In the case of the illustrated embodiment, a lance is shown, however, which is to be exchanged for one of the heretofore conventional lances, the spacings between or clearance of the thimble tubes in the figures being so small or narrow, that end fittings attached thereto would no longer pass through the joint 5 when the lance is drawn out with the reactor cover opened. Consequently, a further extension section 71 is provided which offers an enlargement or widening of the mutual spacings of the holes 92 and 83. At a coupling location, this enlargement or widened section 71, secured against rotation by a key 65, is connected to the part 44. The connection itself is effected through a nut 61 which has an outer thread 64 threadable, by means of a pinion 77 at the end of an actuating shaft 76, onto the part 71 from below. A divided ring 62, which is held in a circular slot of the part 44 by a screw collar ring 63, serves to taking up or absorbing the axial force of this joint. At the lower end of the enlargement or widened section 71, the extensions of the thimble tubes 8, namely, the bores 83, terminate in a plenum or collecting chamber 72; the travelling-chamber guide tube 93, on the other hand, passing through this chamber 72 and termination on the outside thereof in an externally threaded nipple or connecting piece, for the non-illustrated feed line of the travelling-chamber system.

In the extension of the bores 83, connector fittings 84 for inserting the neutron detectors and for tightly closing off this thimble system are provided. Laterally, a gas connection 73 communicates with the collecting chamber 72 of this connecting section 7.

The connecting section 7 has the function of filling the thimble tubes with a medium, such as a gas, for example, which affords improved removal of heat from the detectors A to D.

This additional cooling of the detectors A to D can be dispensed with in the case of especially temperature-resistant detector systems or, also, for example, for lower reactor powers or outputs. The use of such cooling is recommended, however, for lengthening service life. The simplest medium that may be provided in this embodiment is helium which has a thermal conductivity six times greater than that of air. The thermal conductivity can be increased, additionally, by a suitable pressure increase. Other gases or liquids can, of course also be used for heat removal and, similarly, also heat conducting, preferably metallic, contact elements, for example in the form of contact springs.

For filling the thimbles 8 with helium, the nipples 84 are first tightly closed by means of a non-illustrated screw cap, and then a non-illustrated pump is connected to the gas inlet 73 for evacuating the thimbles 8. Then, helium is supplied through this nipple and a slight overpressure with respect to ambient is maintained. Thereupon, the nipples 84 are opened one after another and the detectors A to D with the coaxial connecting cables thereof are advanced up to the deployed positions thereof at the level of the reactor core. The respective deployed positions are marked in advance, for example, by a sleeve slipped over the coaxial cable, and the coaxial cable is gastightly connected to the nipple 84 in this position by means of a screw cap. This occurs sequentially with all four thimbles for the neutron probes. Thereupon, the gas connection 73 is also closed.

When replacing a detector, which, for example, may have become defective, a slight helium gas pressure is again applied, the corresponding closure 84 is opened and the detector drawn out. Helium flows continuously and then the new detector is inserted and the closure reestablished. In this manner, the cooling of the three detectors that are still in operation is maintained without interruption.

When, as mentioned hereinbefore, in about every ten years, the measuring lance must be removed from the reactor and replaced by a new lance, this is done with the reactor cover open. To this end, first the enlargement or widened section 71 is removed by unscrewing the threaded nut 61 with the aid of a shaft 76, and then the divided ring 62 with the screw collar ring 63 and the threaded nut 61 is slipped off downwardly. The nut 53 at the joint 5 is then loosened and removed. Since the reactor coolant is then practically without pressure, the conical joint 45/51 still holds tight. Then, a non-illustrated long sealing sleeve which is closed on one side is screwed into the inner thread 52 of the flange 54 and the seal or closure reestablished thereby. Thereafter, the lance enclosure tube 4 can be withdrawn upwardly together with the built-in thimble tubes 9 and 8 after the upper core support grid 42 and several fuel assemblies have been removed.

Conversely, then a new lance is inserted and the conical seal 45/51 retightened. The non-illustrated sealing sleeve can then be screwed out of the inner thread again and the small amount of reactor coolant contained therein, which might be slightly radioactive, can readily be connected to a water purification plant. After the nut 53 is tightened, the conical seal 45/51 is pressure-tight again, which means that the preparations for restarting the nuclear reactor can be instituted, during which the expansion section 71 can be coupled-on and the measuring probes inserted.

As to the construction thereof, this new measuring lance is independent of the type of detectors with respect to the operating principle thereof and specific purpose. Thus, for example, simple temperature sensors, instead of neutron measuring probes, can be installed, in this manner, in the interior of the reactor core.

To convey some idea of the length of such a measuring lance, it should be mentioned, in conclusion, that the length thereof is in the order of magnitude of 15 m and can, of course, differ from reactor type to reactor type.

There are claimed:

1. A measuring lance forming part of the core instrumentation of a boiling-water nuclear reactor and extending from the bottom of a reactor pressure vessel through the core in a water gap between the fuel assemblies of the core, the lance having a plurality of radiation detectors respectively located at different height levels thereof, and further containing a travelling chamber system movable from height level to height level of the lance for calibrating the detectors and continuously determining neutron flux distribution, the improvement therein comprising thimble tubes wherein the detectors are received, said thimble tubes extending through the wall of the pressure vessel and being sealed from the interior of the pressure vessel, means for individually displacing and exchanging said detectors during reactor operation, means for cooling the detectors, said cooling means being formed of material facilitating heat removal from said thimble tubes, and a lance enclosure tube formed with lateral bores, said large enclosure tube receiving said thimble tubes therewithin, said travelling chamber system comprising a travelling chamber tube, and said lance enclosure tube having a cross section matching the shape of the water gap between four of the fuel assemblies of the core disposed symmetrically to one another, four of said thimble tubes and said travelling chamber tube disposed centrally thereof being received in said lance enclosure tube and forming a structural unit therewith, said structural unit being releasably connected pressure-tightly to the base of the pressure vessel, said structural unit being withdrawable upwardly for replacement during reactor shutdown and when the pressure-vessel cover is opened.

2. Measuring lance according to claim 1 including, means for supplying a flow of reactor coolant to the interior of said lance enclosure tube for contacting said thimble tubes.

3. Measuring lance according to claim 1 wherein said material is a fluid selected from the group of fluids consisting of gases and liquids.

4. Measuring lance according to claim 1 wherein said detector cooling means comprise heat-conductive contact elements disposed between the detectors and said thimble tubes.

5. Measuring lance according to claim 4 wherein said contact elements are metallic.

6. Measuring lance according to claim 1 including a lance guide tube, said lance enclosure tube having a collar thereon at a location thereof above a lower core grid support of the reactor, said collar forming a downwardly directed annular gap and engaging over an end of said lance guide tube, said lance guide tube extending through the base of the pressure vessel and being welded thereto, said lance guide tube having a lower end projecting beyond the pressure-vessel base and releasably connected pressure-tightly to said lance enclosure tube.

7. Measuring lance according to claim 6 including means comprising a unilaterally closed sealing sleeve for water-tightly closing the lower end of said lance guide tube after the pressure-tight connection thereof to said lance enclosure tube is released and before said structural unit is withdrawn upwardly.

* * * * *